US006862163B2

(12) United States Patent
Schierling et al.

(10) Patent No.: US 6,862,163 B2
(45) Date of Patent: Mar. 1, 2005

(54) METHOD AND DEVICE FOR BRIDGING BRIEF POWER OUTAGES IN A MATRIX CONVERTER

(75) Inventors: Hubert Schierling, Erlangen (DE); Manfred Bruckmann, Nürnberg (DE); Olaf Simon, Bruchsal (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/762,756

(22) Filed: Jan. 16, 2004

(65) Prior Publication Data

US 2004/0151119 A1 Aug. 5, 2004

Related U.S. Application Data

(63) Continuation of application No. PCT/DE02/02474, filed on Jul. 5, 2002.

(30) Foreign Application Priority Data

Jul. 19, 2001 (DE) .......................................... 101 35 286

(51) Int. Cl.[7] .............................................. H02H 3/24
(52) U.S. Cl. ......................................... 361/92; 307/130
(58) Field of Search ..................... 361/92, 88; 307/130, 307/31

(56) References Cited

U.S. PATENT DOCUMENTS

| | | | |
|---|---|---|---|
| 4,409,533 A | | 10/1983 | Kawabata |
| 4,689,542 A | | 8/1987 | Ibori et al. |
| 4,697,230 A | * | 9/1987 | Neft ............................ 361/88 |
| 5,475,292 A | | 12/1995 | Nakanishi et al. |

FOREIGN PATENT DOCUMENTS

| | | |
|---|---|---|
| JP | 06 153587 A | 5/1994 |
| JP | 08 130882 A | 5/1996 |

OTHER PUBLICATIONS

Holtz J et al.: "Controlled AC drives with ride–through capability at power interruption" Industry Applications Society Annual Meeting 1993., Conference Record of the 1993 IEEE Toronto, Ont., Canada Oct. 2–8, 1993. New York NY, USA, IEEE, US, pp. 629–636, XP010118698, ISBN: 0–7803–1462–X.

Klumpner C et al.: "Short term ride through capabilities for direct frequency converters" Conference Proceedings, XP010517244, 2000, no month.

Sunter et al.: "A true four quadrant matrix converter induction motor drive with servo performance" Pesc 96 Record. 27th Annual IEEE Power Electronics Specialists Conference (Cat. No. 96CH35962), Baveno, Italy, Jun. 23–27, 1996, pp. 146–151 vol. 1, XP002236654 1996, New York, NY. USA, IEEE, USA ISBN: 0–7803–3500–7.

Wiechmann E P et al.: "Continuously motor–synchronized ride–through capability for matrix–converter adjustable–speed drives" IEEE Transactions on Industrial Electronics, Apr. 2002, IEEE, USA, vol. 49, No. 2, pp. 390–400, XP002236655.

* cited by examiner

*Primary Examiner*—Shawn Riley
(74) *Attorney, Agent, or Firm*—Henry M. Feiereisen

(57) ABSTRACT

A method and a device for bridging temporary power outages in a matrix converter are disclosed. In the event of a detected power failure, the matrix converter is disconnected from the power line and changes into a buffer mode in which a determined actual capacitor voltage space vector is regulated to a predetermined space vector. When the power line is reestablished, the actual capacitor space vector is synchronized and the matrix converter is reconnected to the power line during the synchronization. This allows a conventional matrix converter to take advantage of kinetic load buffering.

32 Claims, 11 Drawing Sheets

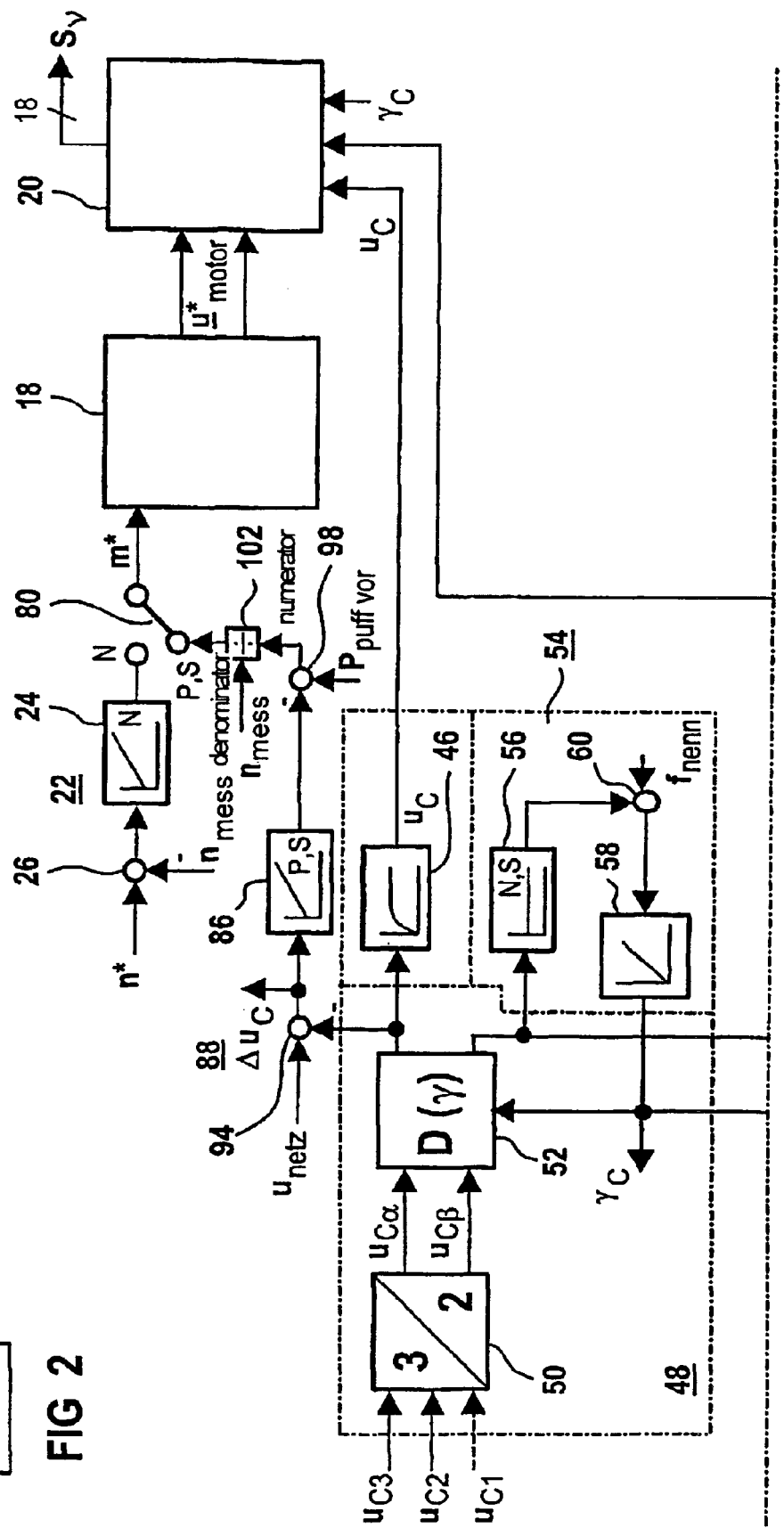

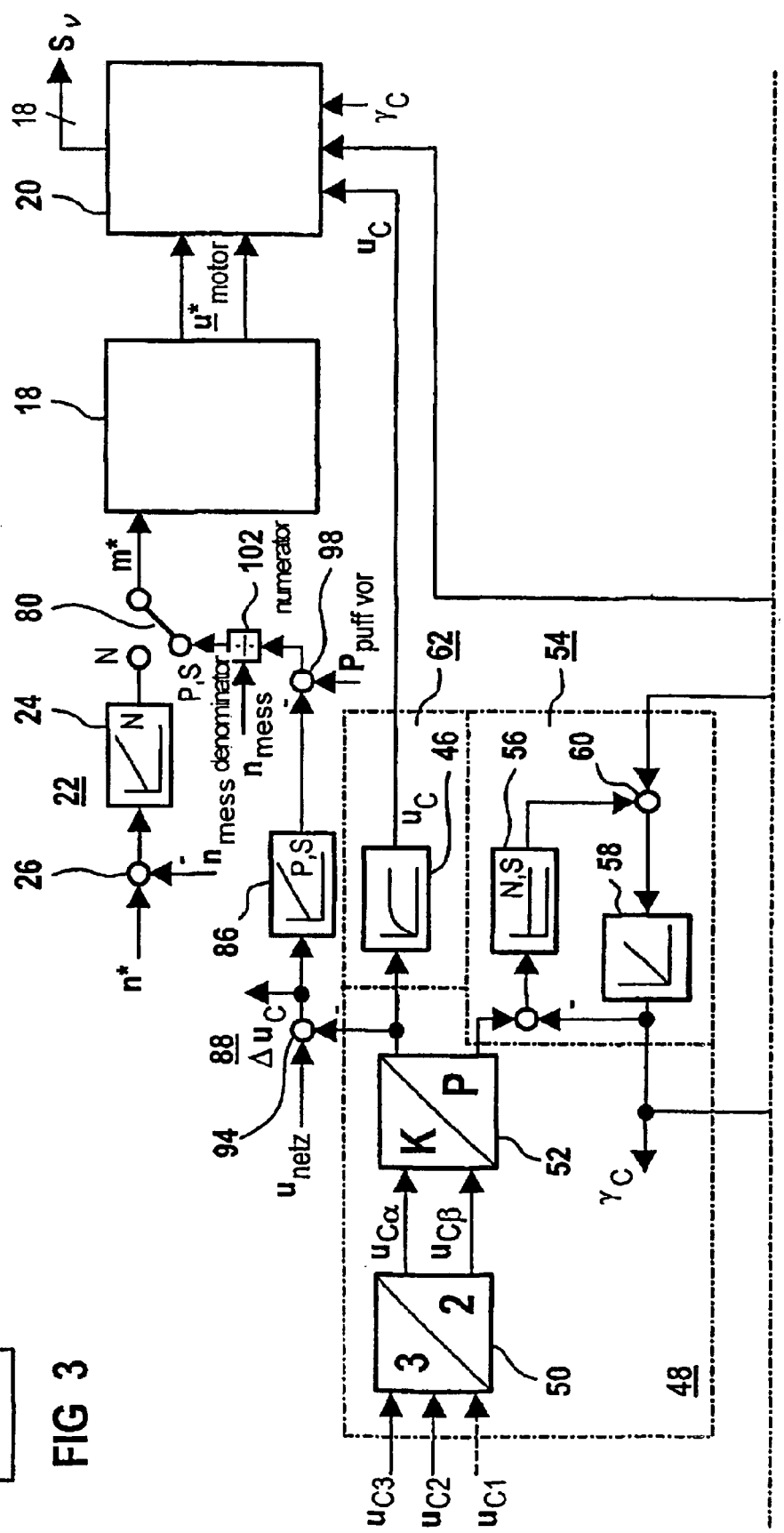

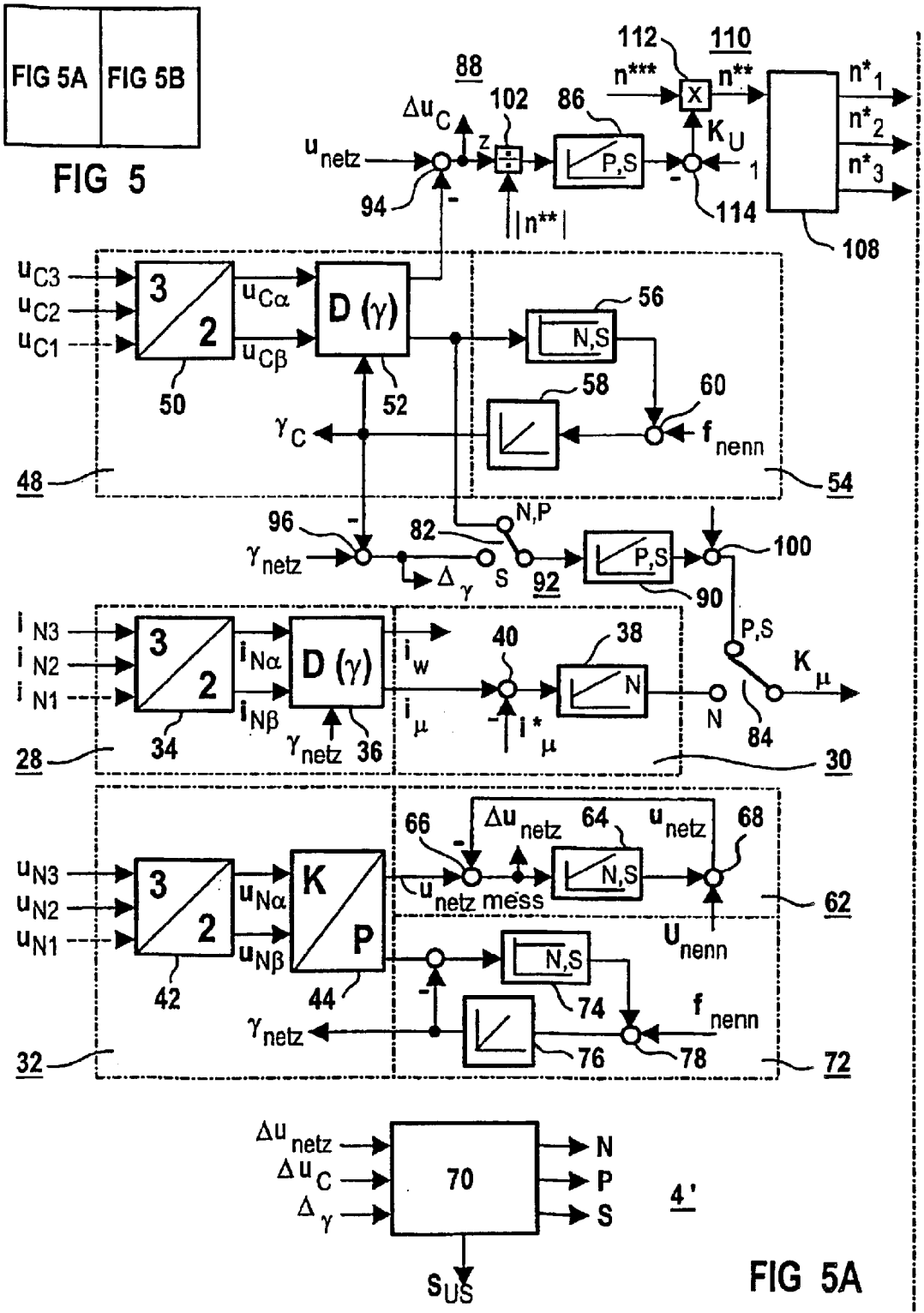

METHOD AND DEVICE FOR BRIDGING BRIEF POWER OUTAGES IN A MATRIX CONVERTER

CROSS-REFERENCES TO RELATED APPLICATIONS

This application is a continuation of prior filed copending PCT International application no. PCT/DE02/02474, filed Jul. 5, 2002, which designated the United States and on which priority is claimed under 35 U.S.C. §120, the disclosure of which is hereby incorporated by reference.

This application claims the priority of German Patent Application, Serial No. 101 35 286.7, filed Jul. 19, 2001, pursuant to 35 U.S.C. 119(a)–(d), the disclosure of which is incorporated herein by reference.

BACKGROUND OF THE INVENTION

The present invention relates to a method for bridging brief power outages in a matrix converter with several power line-side commutation capacitors and a power line-side switching unit, as well as to a device for carrying out the method.

After a brief power outage, the desired rotation speed of individual drives should be re-established as quickly as a possible. Without additional measures, long restart times occur because signal processing has to be reestablished and newly initialized and the motor has to be newly excited. When several drives have to perform mechanically coordinated movements, the controllability of the drives can be lost during a power outage, which can damage the mechanical parts, unless additional measures are implemented.

The aforedescribed problem can be eliminated, for example, with an uninterruptible power supply, also referred to as UPS. Individual drives or several mechanically coupled drives can be connected to these UPS to provide a reliable power source independent of the state of the power grid. However, this solution is complex and costly for individual drives and/or drives with several motors.

Converter technology employing a voltage intermediate circuit can protect converter-supplied drives in the event of brief power outages. This option is referred to as kinetic buffering.

During a power outage, a single drive is driven into the generator operating mode when braking, with the kinetic energy of the motor and the coupled driven machine making up for the losses in the motor and of the converter. This is accomplished by using a controller that controls the intermediate circuit voltage to a fixed value, for example, to 80% of its nominal value. The control variable is the torque setpoint, or with a field-oriented controller an addition to the torque setpoint, or with the drives having U/f curve control an addition to the setpoint of the frequency. The supply voltage for the signal processing circuit is generated either separately from a reliable source or from the DC intermediate circuit. As a result, the signal processing circuit and the controller remain active, so that the motor stays excited and can be accelerated again to the speed setpoint immediately after the line voltage has been reestablished.

With several coupled drives, all intermediate circuits are coupled with each other to allow an energy exchange therebetween. In the event of a power outage, the rotation speed of all drives is lowered so as to make up for the energy requirements. The necessary rotation speed relationships or phase relationships between the various drives remain unchanged until the line voltage is reestablished or the system comes to a stop. The supply voltage of the signal processing circuit is generated in the same manner as described above for single drives. The intermediate circuit voltage is regulated to a value below the nominal value. The control variable is the main velocity setpoint of the system.

The option "kinetic buffering" can only be used with converters having a DC voltage intermediate circuit or a DC current intermediate circuit. This option cannot be employed with matrix converter which lacks an intermediate circuit.

When using a single drive, a matrix converter controlling a motor is connected to a power supply via an optional power line filter or an electromagnetic compatibility filter. This power line filter is implemented, for example, by employing line chokes and commutation capacitors connected to the input terminals of the matrix converter. The commutation capacitors which can be connected in a Delta or Star configuration, are essential for the operation of the matrix converter. However, the chokes in the supply lines may optionally be omitted.

In a multi-axis drive, several of the aforedescribed individual drives are operated from the same power grid. In other words, the input side of each matrix converter includes commutation capacitors and chokes. The number of chokes can be reduced by connecting the matrix converters electrically in parallel at the commutation capacitors. With this circuit variant, only three chokes are required with a three-phase power line.

It would therefore be desirable and advantageous to provide an improved method and a device for bridging brief power outages, which obviates prior art shortcomings and is able to specifically with conventional matrix converters.

SUMMARY OF THE INVENTION

According to one aspect of the present invention, a method for bridging brief power outages in a matrix converter is described. The matrix converter has a plurality of power input-side commutation capacitors and a power input-side switching unit. The method includes the steps of immediately disconnecting the matrix converter from the power supply in the event of a detected power outage, so that the matrix converter operates in a buffer operating mode; controlling the matrix converter in the buffer operating mode so as to generate at an input of the matrix converter an actual capacitor voltage space vector with a predetermined amplitude and phase angle; when the line power is reestablished, tracking the created actual capacitor voltage space vector during a synchronization phase with respect to a measured actual power line voltage space vector until the actual capacitor voltage space vector and the actual power line voltage space vector coincide; and reconnecting the matrix converter to the power supply.

A prerequisite for the method of the invention is a controllable isolation point located between the power supply line and the matrix converter. This isolation point must provide an immediate disconnect during a detected power outage and must be closed immediately after power has been reestablished and after successful synchronization.

The method of the invention also takes advantage of the fact that the power factor or the reactive current on the power line side in a matrix converter can be freely adjusted within certain limits. The input-side reactive current or the power factor of the matrix converter is controlled by a control variable for the control of the capacitor voltage space vector during the buffer operating mode and the synchronization operating mode. A second control variable for controlling the capacitor voltage space vector can be used to adjust the rotation speed of the motor connected to the matrix converter. The voltage at the commutation capacitors is controlled by the method of the invention so as to keep the total energy stored in the commutation capacitors at a constant value during a power outage. After the power supply is reestablished, the capacitor voltage is rotated to the line voltage of the power supply.

With the method of the invention for bridging brief power outages, the option "kinetic buffering" can now also be employed with a matrix converter, which alleviates one of the disadvantages of this converter topology.

According to another aspect of the invention, a device for bridging brief power outages in a matrix converter is described, wherein the matrix converter includes a controller, a plurality of power input side commutation capacitors and a power input side switching unit. The device includes a first unit for measuring an actual capacitor voltage space vector; a second unit for measuring an actual power line voltage space vector, with the second unit being connected with two control inputs of the controller of the matrix converter; a plurality of switches; and a voltage control circuit having an input which is connected with an amplitude output of the first unit and another input which is connected with an amplitude output of the second unit, and an output which is connected via a first of the plurality of switches with a nominal value input of the controller of the matrix converter. The device further includes a phase angle control circuit having an input connected with corresponding phase angle outputs of the first and second unit, and an output connected via a second switch with a third control input of the controller of the matrix converter; a power line voltage monitoring device having an input which is connected with an amplitude output of the second unit; and a sequence controller having an input which is connected with a deviation output of the voltage control circuit, of the phase control circuit and of the power line voltage monitoring device, and an output which is connected with a control input of the plurality of switches and with a control input of the switching unit.

According to yet another aspect of the invention, pre-control values are used instead of a phase angle control circuit, which are supplied to the control of the matrix converter as a control variable via a switch, depending on the operating mode.

Advantageous embodiments of the device can include one or more of the following features. The device can include a vector phase control circuit connected with the outputs of the phase outputs of the first and second units. The output of the second switch can be connected with a frequency input of the vector phase control circuit, and the frequency input of the vector phase control circuit can be connected with the phase output of the first unit. The first unit can include a coordinate transformer with a vector rotator connected downstream of the coordinate transformer, whereas the second unit can include two coordinate converters connected in series. A smoothing device for smoothing a phase angle can be connected downstream of the amplitude output of the first unit. A vector phase control circuit can also be connected downstream of the phase angle output of the second unit. The voltage control circuit can further include a comparator with a regulator connected downstream of the comparator. The phase angle control circuit can include a comparator with a regulator connected downstream of the comparator. A comparator can also be connected to an input of the phase angle control circuit and a regulator connected downstream of the phase angle control circuit, wherein a first input of the regulator can be connected to an output of the comparator through a third of the plurality of switches and a second input of the regulator can be connected to the phase angle output of the second unit. The device can also include a signal processor.

According to another advantageous feature of the invention, fixed control variables for the reactive current can be defined for each of the buffer and synchronization operating modes. The second unit for measuring the line voltage space vector and the reactive current control circuit connected downstream are also present in a matrix converter without kinetic buffering that has, however, power factor control. As a result, the complexity of the method of the invention is reduced.

The invention is also directed to a controller for a matrix converter with a device that bridges brief power outages in a matrix converter.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
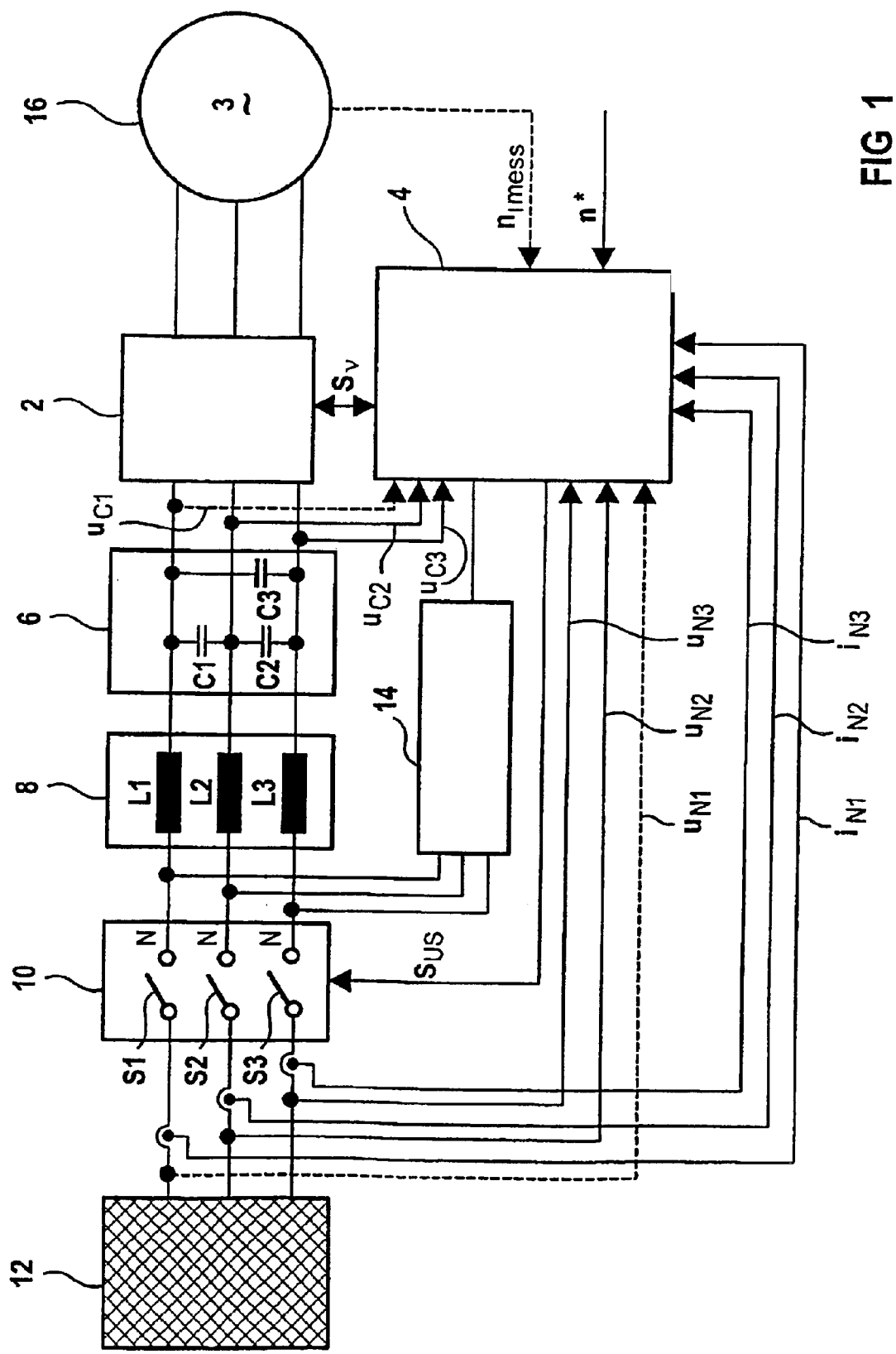
FIG. 1 shows a block circuit diagram of an individual drive.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned but have different inventive entity. Both applications are unique, but incorporate the other by reference. Accordingly, the following U.S. patent application is hereby expressly incorporated by reference: "Method and Device for Shutting Down a Drive with a Matrix Converter During a Power Outage".

Turning now to the drawing, and in particular to FIG. 1, there is shown a matrix converter 2, an associated controller 4, a commutation capacitor circuit 6, a choke circuit 8, a switching unit 10, a power supply or power grid 12, a voltage supply unit 14 and a driven motor 16. The output of the matrix converter 2 is connected to terminals of the motor 16, while the input of the matrix converter 2 is connected with the commutation capacitor circuit 6. The commutation capacitor circuit 6 includes three commutation capacitors C1, C2 and C3 which are connected in a Delta configuration. The commutation capacitors C1, C2 and C3 can also be connected in a Star configuration. The choke circuit 8 is connected before the commutation capacitor circuit 6, whereby the input of the choke circuit 8 can be connected to the power supply 12 via the switching unit 10. The choke circuit 8 has three inductances L1, L2 and L3, with each inductance being located in a corresponding power line. The switching unit 10 has three switches S1, S2 and S3 which can be used to disconnect the power lines between the power supply 12 and the choke circuit 8. The input of the voltage supply unit 14 is connected with the outputs of the switching unit 10, whereas the output of the voltage supply unit 14 is connected with a supply terminal of the controller 4 of the matrix converter 2. The controller 4 is supplied with at least two measured line phase voltages $u_{N2}$ and $u_{N3}$ and measured capacitor voltages $u_{C1}$, $u_{C2}$ and $u_{C3}$. In addition, the measured line phase voltage $u_{N1}$ can also be supplied. The capacitor voltages $u_{C1}$, $u_{C2}$ and $u_{C3}$ are measured at the input of the matrix converter 2 and represent the input voltages of the matrix converter 2. In addition, a measured actual rotation speed value $n_{mess}$ and a rotation speed setpoint n* are supplied to two additional inputs. In the depicted embodiment of the controller 4, measured line currents $i_{N1}$, $i_{N2}$ and $i_{N3}$ are also supplied. The output of the controller 4 is connected via control lines with control inputs of the matrix converter 2 and with a control input of the switching unit 10. The combination of choke circuit 8 and commutation capacitor circuit 6 forms a line filter.

In the normal operating mode, indicated by the letter "N", the switches S1, S2 and S3 of the switching unit 10 are closed, i.e., the switches S1, S2 and S3 are switched to the position N. The switches S1, S2 and S3 are implemented as fast switches, so that the matrix converter can be immediately disconnected from the power supply 12 in the event of a power outage. Fast switches S1, S2 and S3 can be implemented, for example, as semiconductor switches. The matrix converter can continue to operate without noticeable interruption when quickly disconnected together with the input-side commutation capacitor circuit 6. A measured actual capacitor voltage space vector $\vec{u}_{Cmess}$ shortly before a power outage then corresponds to a measured actual capacitor voltage space vector $\vec{u}_{Cmess}$ shortly after the disconnection. In other words, due to the fast switches S1, S2 and S3, the actual input voltage space vector $\vec{u}_{Cmess}$ shortly after the disconnection has changed only insignificantly relative to an actual input voltage space vector $\vec{u}_{Cmess}$ at a time shortly before the disconnection. The actual input voltage space vector $\vec{u}_{Cmess}$ corresponds to the power line voltage space vector $\vec{u}_{netzmess}$ with the nominal amplitude $u_{Nenn}$. In the buffer operating mode, designated by the letter P, the motor 16 is controlled so as to maintain the nominal value $u_{Nenn}$ of the line amplitude, so that the actual input voltage space vector $\vec{u}_{Cmess}$ only has to be rotated to the determined power line voltage space vector $\vec{u}_{netzmess}$ when the power is reconnected. If the two space vectors $\vec{u}_{Cmess}$ and $\vec{u}_{netzmess}$ overlap, then the synchronization operation is successfully concluded and the normal operating mode is assumed.

Figure 2B:
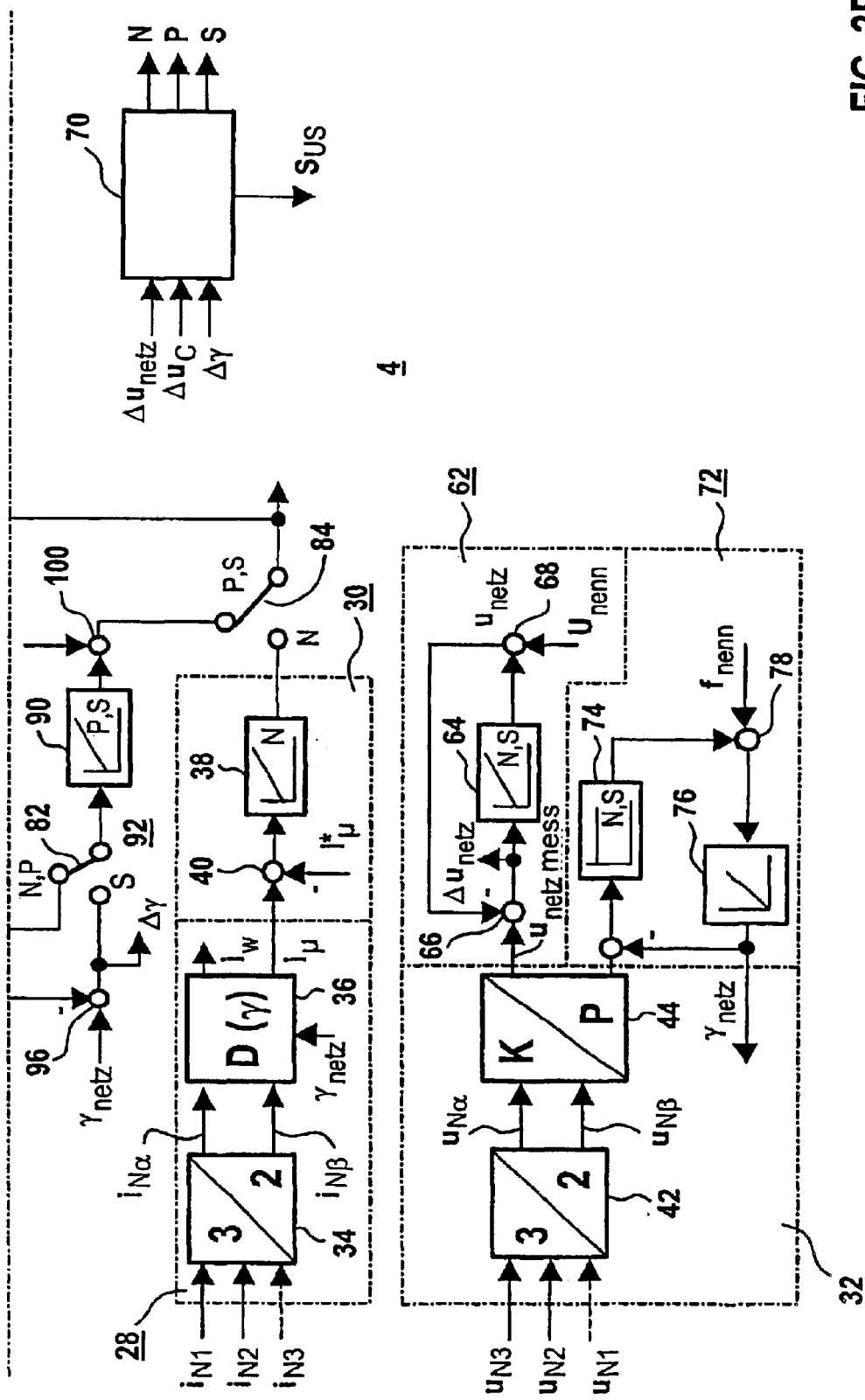
FIG. 2 is a functional block diagram of a controller for the individual drive of FIG. 1.

FIG. 2, split into FIGS. 2A and 2B for sake of clarity, shows the functional block diagram of the controller 4 of FIG. 1. The controller 4 has a regulator unit 18 and a control unit 20. A higher level rotation speed control circuit 22, which supplies to the regulator unit a desired torque value m*, is connected before the regulator unit 18. The rotation speed control circuit 22 consists of a rotation speed controller 24 and a comparator 26 which compares a measured actual rotation speed value $n_{mess}$ with a rotation speed setpoint n*. In addition, the controller 4 includes a unit 28 for measuring an actual power line current space vector $\vec{i}_{netzmess}$, a reactive current control circuit 30 and a unit 32 for measuring an actual power line voltage space vector $\vec{u}_{netzmess}$. The unit 28 and the following reactive current control circuit 30 are not required for carrying on the method of the invention. These two units 28 and 30 enable generation of a third control variable for the control unit 20 in normal operating mode N. A phase angle output of the unit 32 for measuring an actual power line voltage space vector $\vec{u}_{netzmess}$ is connected with an angle adjustment input of the unit 28 for measuring the actual power line current space vector $\vec{i}_{netzmess}$.

The unit 28 includes a coordinate transformer with a downstream vector rotator 36. The downstream reactive current control circuit 30 includes a regulator 38 and a comparator 40. The unit 32 for measuring an actual power line voltage space vector $\vec{u}_{netzmess}$ also has a coordinate transformer 42 with an additional coordinate transformer 44 connected downstream. At least two measured values $i_{N1}$, $i_{N2}$ and $u_{N1}$, $u_{N2}$, respectively are applied to the inputs of the input-side coordinate transformer 34 and 42, respectively, of the units 28 and 32, respectively. All three measured line current values $i_{N1}$, $i_{N2}$, $i_{N3}$ and line phase voltages $u_{N1}$, $u_{N2}$, $u_{N3}$ can be supplied to the corresponding coordinate transformer 34 and 42, respectively.

The coordinate transformers 34 and 42 are used to transform a three-phase system into an orthogonal two-phase system. The orthogonal components $i_{N\alpha}$ and $i_{N\beta}$, and $u_{N\alpha}$ and $u_{N\beta}$ of an actual power line current space vector $\vec{i}_{netzmess}$ or actual power line voltage space vector $\vec{u}_{netzmess}$ that rotate with the line frequency $f_N$ are present at the two outputs of the coordinate transformer 34 and 42. The coordinate transformer 44 connected downstream transforms the orthogonal rotating components $u_{N\alpha}$ and $u_{N\beta}$ of the actual power line voltage space vector $\vec{u}_{netzmess}$ into polar components amplitude $u_{netzmess}$ and phase angle $\gamma_{netz\ mess}$ of the actual power line voltage space vector $\vec{u}_{netzmess}$ With the help of the smoothed polar component phase angle $\gamma_{netz}$ of the actual power line voltage space vector $\vec{u}_{netzmess}$ and the vector rotator 36 of the unit 28 for measuring an actual power line current space vector $\vec{i}_{netzmess}$, the two rotating orthogonal current components $i_{N\alpha}$ and $i_{N\beta}$ are transformed into two stationary current components $i_W$ and $i_\mu$ of a coordinate system that rotates with the rotating actual power line voltage space vector $\vec{u}_{netzmess}$. In other words, the actual power line current space vector $\vec{i}_{netzmess}$ is mapped onto the actual power line voltage space vector $\vec{u}_{netzmess}$.

These two current components $i_W$ and $i_\mu$ represent a component in the direction of the actual power line voltage space vector $\vec{u}_{netzmess}$ and a component perpendicular to the direction of the actual power line voltage space vector $\vec{u}_{netzmess}$. The component $i_W$ is therefore referred to as active current and the component $i_\mu$ as reactive current. The determined reactive current component $i_\mu$ of the actual power line current space vector $\vec{i}_{netzmess}$ is controlled in the downstream reactive current control circuit 30 to a predetermined nominal reactive current value $i^*_\mu$. The control variable at the output of the controller 38 is supplied to a third input of the control unit 20.

Two additional inputs of the control unit 20 are connected with an output of a smoothing filter 46 and a phase output of a unit 48 for measuring an actual capacitor voltage space vector $\vec{u}_{Cmess}$. The unit 48 for measuring an actual capacitor voltage space vector $\vec{u}_{Cmess}$ determines the actual capacitor voltage space vector $\vec{u}_{Cmess}$ as a function of the phase angle $\gamma_C$ from measured capacitor voltages $u_{C2}$ and $u_{C3}$, or $u_{C1}$, $u_{C2}$ and $u_{C3}$. For this purpose, the unit 48 includes a coordinate transformer 50 and a vector rotator 52 connected downstream of the coordinate converter 50. The coordinate transformer 50 generates from the measured capacitor voltages $u_{C1}$, $u_{C2}$ and $u_{C3}$ two orthogonal rotating voltage components $u_{C\alpha}$ and $u_{C\beta}$ which are converted into two stationary polar voltage components that depend on the smoothed phase angle $\gamma_C$ of the measured rotating actual capacitor voltage space vector $\vec{u}_{Cmess}$. The first component representing the amplitude is smoothed by the smoothing filter 46. The second component representing the phase angle error is converted into the phase angle $\gamma_C$ by a vector phase control circuit 54, which includes a controller 56, an integrator 58 and an adder 60. Also supplied to the adder 60 is a nominal value $f_{Nenn}$ of the power line frequency $f_N$ for changing the phase angle $\gamma_C$ (rotating vector). The smoothed polar components $u_C$ and $\gamma_C$ of the actual input voltage space vector $\vec{u}_{Cmess}$ of the matrix converter are required for computing the control signals $S_v$ of the matrix converter 2.

In order to use the controller 4 also for bridging brief power outages, it must first be determined if a power outage has actually occurred.

A power outage is detected by a line voltage monitoring device 62 which is connected downstream of the amplitude output of the unit 32 that measures an actual power line voltage space vector $\vec{u}_{netzmess}$. The power line voltage monitoring device 62 includes a proportional-integral (PI) controller 64, a comparator 66 and an adder 68 for determining if the amplitude $u_{netz\ mess}$ of the actual power line voltage space vector $\vec{u}_{netzmess}$ falls below a predetermined lower tolerance limit. For this purpose, an amplitude deviation $\Delta u_{netz}$ is determined and supplied to a sequence controller 70. If the measured amplitude deviation $\Delta u_{netz}$ exceeds a predetermined value, then the sequence controller 70 switches from a normal operating mode N to a buffer operating mode P. Based on an affirmative determination, the buffer operating mode P is initiated by an output signal from the sequence controller 70. In other words, all switches 80, 82, 84 are switched to the position P and all controllers identified with P are enabled.

In order to prevent variations of the actual power line voltage space vector $\vec{u}_{netzmess}$ from affecting the projection of the actual power line current space vector $\vec{i}_{netzmess}$ onto the actual power line voltage space vector $\vec{u}_{netzmess}$, the phase angle $\gamma_{netz}$ of the actual power line voltage space vector $\vec{u}_{netzmess}$ is smoothed by a vector control circuit 72, which also includes a controller 74, an integrator 76, a comparator and an adder 78. The nominal value $f_{Nenn}$ of the power line frequency $f_N$ is applied to the input of the adder 78.

The controllers identified with P include a controller 86 of a voltage control circuit 88 and a controller 90 of a phase angle control circuit 92. The voltage control circuit 88 includes in addition to the controller 86 a comparator 94, whereby the amplitude $u_{C\ mess}$ of the measured actual capacitor voltage space vector $\vec{u}_{Cmess}$ is applied to the inverting input and a predetermined amplitude value, for example the nominal value of the power line voltage $u_{Nenn}$, is applied to the non-inverting input of the comparator 94. The phase angle control circuit 92 also includes a comparator 96, whereby the smoothed phase angle $\gamma_C$ of the measured actual capacitor voltage space vector $\vec{u}_{Cmess}$ is applied to the inverting input and the smoothed phase angle $\gamma_{Netz}$ of the actual power line voltage space vector $\vec{u}_{netzmess}$ is applied to the non-inverting input of the comparator 96. The deviations $\Delta u_C$ and $\Delta\gamma$ determined with the comparators 94 and 96 are not only supplied to the corresponding downstream controllers 86 and 90, but also to the sequence controller 70 which processes these values. The controllers 86 and 90 are pre-controlled for quickly reaching the steady state. The controllers 86 and 90 each have a respective summation point 98 and 100. The pre-control value for the voltage controller 86 is an expected dissipated power $P_{puff\ vor}$ of the matrix converter 2. The output of the summation point 98 is connected with a divider 102, whereby the output of the divider 102 is connected with an input of the switch 80. This divider is only used for linearizing the control path and for changing the polarity during reversal of the rotation direction. The actual rotation speed value $n_{mess}$ is applied to the divisor input of the divider 102.

The second input of switch 80 is connected with the output of the rotation speed controller 24. The output of switch 80 is connected with a control variable input of the control unit 18 which generates a desired motor voltage space vector $\vec{u}^*_{motor}$. The control unit 20 then generates as a function of the polar component $u_C$ and $\gamma_C$ of the actual capacitor voltage space vector $\vec{u}_{Cmess}$ and a control variable for the power factor control signals $S_v$ for the turn-off semiconductor switches of the matrix converter 2.

In the buffer operating mode P, the control variable for the power factor is not generated by the reactive current control circuit 30, but rather by the phase control circuit 92. The phase control circuit 92 includes the switch 82 connected between the input-side comparator 96 and the controller 90, whereby the switch 82 can be used to apply a measured phase angle deviation $\Delta\gamma$ or the second output of the vector rotator 52 representing a phase angle deviation of the measured actual capacitor voltage space vector $\vec{u}_{Cmess}$ to the controller input. The outputs of the reactive current controller 38 and of the pre-controlled phase angle controller 90 are each connected with a respective input of the switch 84. The output of switch 84 is connected with an input of the control unit 20 for the control variable for the power factor. In the buffer operating mode P, the phase angle $\gamma_C$ of the measured actual capacitor voltage space vector $\vec{u}_{Cmess}$ is controlled. In other words, the phase angle $\gamma_C$ of the measured actual capacitor voltage space vector $\vec{u}_{Cmess}$ is controlled so as to change in relation to the nominal value $f_{nenn}$ of the line frequency $f_N$ (rotating vector). The pre-control value of the phase angle controller 90 is an expected reactive current that depends on the size of the commutation capacitors C1, C2 and C3, on the magnitude of the amplitude $u_{nenn}$ of the controlled actual capacitor voltage space vector $\vec{u}_{Cmess}$ and on the line frequency $\omega_N$.

As a result, in buffer operating mode P, the actual capacitor voltage space vector $\vec{u}_{Cmess}$ is regulated to an actual power line voltage space vector $\vec{u}_{netzmess}$ measured shortly before the outage which continues to rotate with the nominal value of the line frequency. The longest possible time interval for bridging a power outage depends on the inertial mass of the drive. When the drive stops because the entire kinetic energy is used up, the capacitor voltage $\vec{u}_{Cmess}$ collapses, so that the drive is switched off with the error message "Line Voltage Failure."

In the buffer operating mode P, the power supply 12 is monitored for a return of the line voltage. This is done by the sequence controller 70 depending on the measured amplitude deviation $\Delta u_{netz}$ of the line voltage. The line voltage has returned, if the amplitude deviation $\Delta u_{netz}$ is less than a predetermined value. As soon as this is recognized, the sequence controller 70 controls the switches 80, 82 and 84 so that the switches assume the position S for the synchronization mode S. In addition, all controllers identified with S are enabled. These switching operations cause a change from the buffer operating mode P into the synchronization mode S.

The synchronization mode S is different from the buffer operating mode P in that a measured phase angle deviation $\Delta\gamma$ between the phase angle $\gamma_{netz}$ of the actual power line voltage space vector $\vec{u}_{netzmess}$ and the phase angle $\gamma_C$ of the actual capacitor voltage space vector $\vec{u}_{Cmess}$ is used in the phase control circuit 92. The amplitude $u_C$ and the phase angle $\gamma_C$ of the actual capacitor voltage space vector $\vec{u}_{Cmess}$ are now controlled so that the actual capacitor voltage space vector $\vec{u}_{Cmess}$ coincides with the actual power line voltage space vector $\vec{u}_{netzmess}$, in which case the measured amplitude deviation $\Delta u_C$ and the phase angle deviation $\Delta\gamma$ become zero. As soon as the sequence controller 70 detects this situation, the switches S1, S2 and S3 of the switching unit 10 are closed again, causing the controller 4 to switch into the normal operating mode. The subsequent acceleration to the original rotation speed setpoint n* can occur gradually, for example, by providing the control value of the rotation speed setpoint n* by a ramp generator (not shown). The ramp generator is set to the instantaneous rotation speed value $n_{mess}$ during the change into the normal operating mode.

Figure 3B:
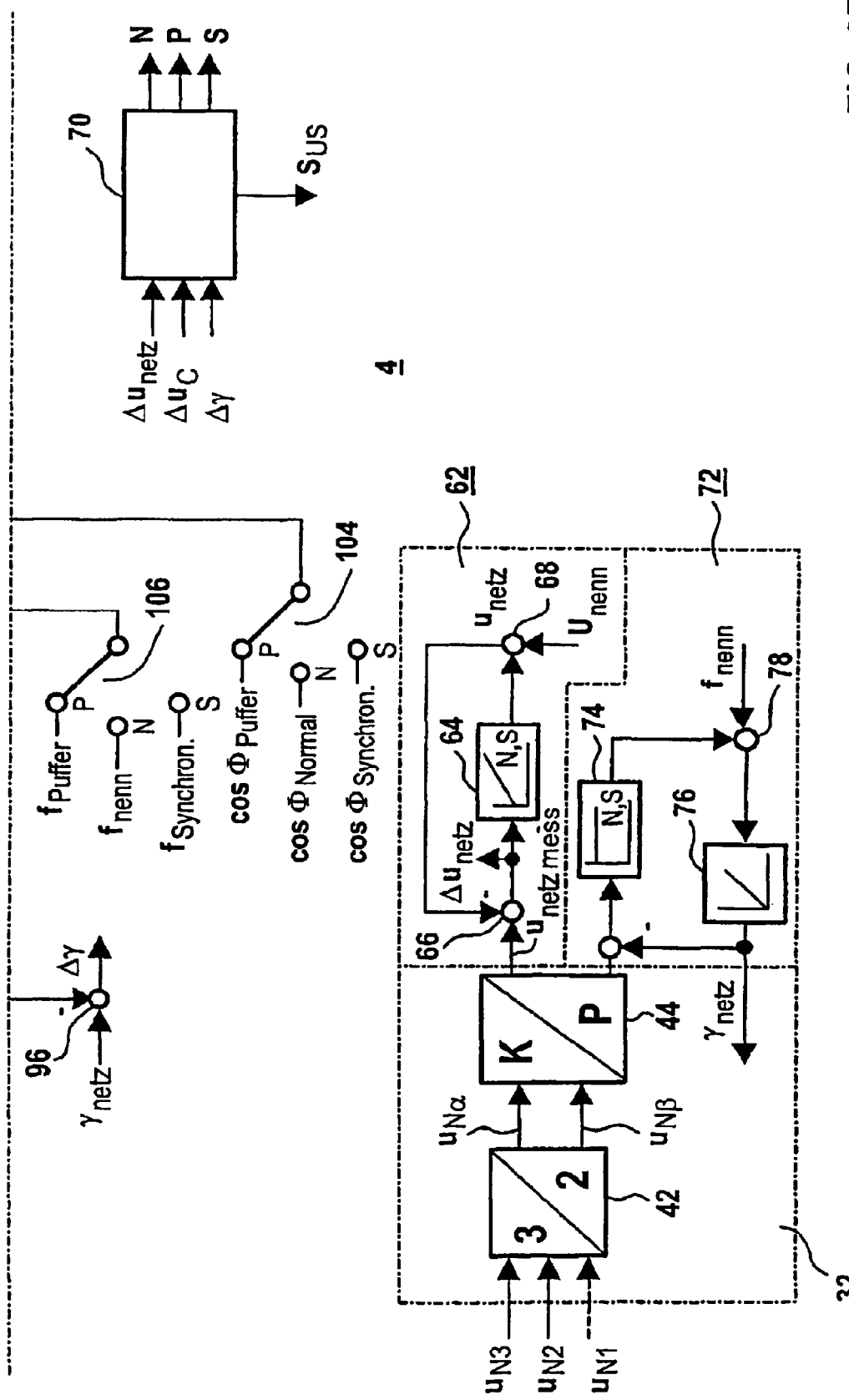
FIG. 3 is a functional block diagram of a controller for the individual drive of FIG. 1.

FIG. 3, split into FIGS. 3A and 3B for sake of clarity, shows a detailed functional block diagram of an advantageous controller for a single drive according to FIG. 1. Unlike the functional block diagram of the controller according to FIG. 2, pre-control values for the power factor and for the frequency of the capacitor voltage are used for the various operating modes of the controller 4 of the matrix converter 2, instead of a unit 28 that measures an actual power line current space vector $\vec{i}_{netzmess}$ together with a downstream reactive current control circuit 30. The pre-control values for the power factor are supplied to the corresponding input of the control unit 20 via a switch 104. The pre-control values for the frequency of the capacitor voltage are applied to an input of the comparator 60 of the vector control circuit 54 that smoothes the phase angle $\gamma_C$ of the actual capacitor voltage space vector $\vec{u}_{Cmess}$. It can be seen that the control variable "cos $\phi$" can be preset and controlled depending on the operating state. The frequency of the phase angle $\gamma_C$ of the actual capacitor voltage space vector $\vec{u}_{Cmess}$ adjusts itself freely in buffer operating mode and during the synchronization. The pre-control values $f_{Puffer}$, $f_{Synchron}$ and $f_{nenn}$ for the buffer operating mode P, the synchronization mode S and the normal operating mode N are only used for pre-controlling the vector phase control circuit 54 that smoothes the phase angle $\gamma_C$ of the actual capacitor voltage space vector $\vec{u}_{Cmess}$. After the power line voltage has returned, the converter switches into normal operating mode N, where the fast switches S1, S2 and S3 of the switching unit 10 are switched in at a predetermined point in time. This predetermined point in time depends on the phase angle deviation $\Delta\gamma$ between the actual capacitor voltage space vector $\vec{u}_{Cmess}$ and the actual power line voltage space vector $\vec{u}_{netzmess}$. A preferred point in time for switching in the switches is when the phase angle deviation $\Delta\gamma$ is approximately zero. By controllably presetting the reactive current $i_\mu$ through the pre-control value cos $\phi_{Synchron}$ according to a frequency $f_{Synchron}$, the required tolerances for the speed and/or the accuracy for switching in the switches can be relaxed. However, the synchronization points, where the switches S1, S2 and S3 can be switched in, occur less frequently in this case.

Advantageously, this control significantly simplifies signal processing, however at the expense of a prolonged synchronization mode S; also, switching in the switches requires more involved balancing operations. The buffer value $f_{Puffer}$ can not only have a value close to the nominal value $f_{nenn}$ of the line frequency $f_N$, but can also have a value of zero. In this case, the actual capacitor voltage space vector $\vec{u}_{Cmess}$ is a stationary vector (DC voltage), so that users requiring line frequency voltages cannot be serviced.

Figure 4:
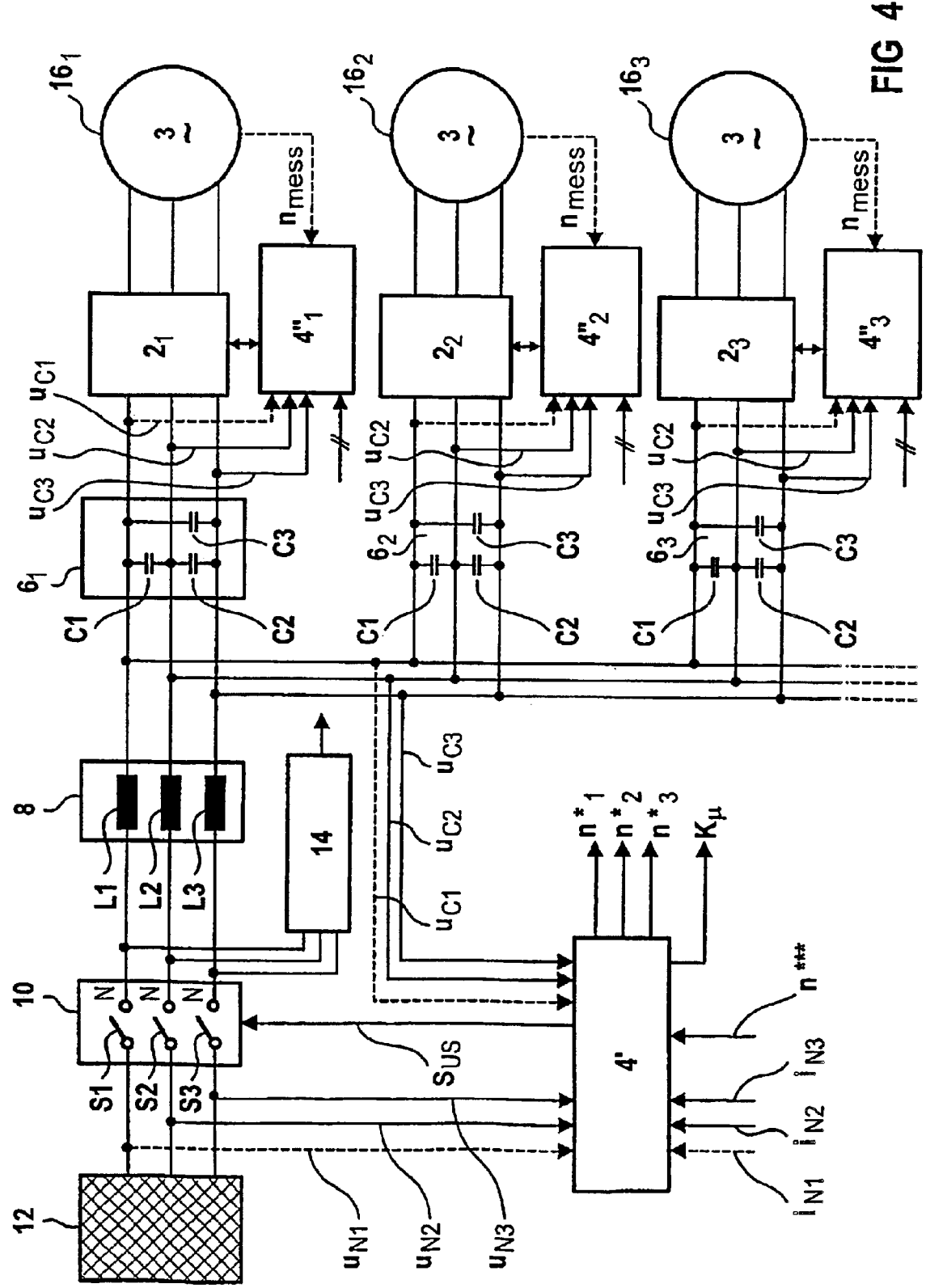
FIG. 4 is a block circuit diagram of a multi-axis drive.

FIG. 4 depicts a block circuit diagram of a multi-axis drive, which has for each axis a motor $16_1$, $16_2$, $16_3$, a matrix converter $2_1$, $2_2$, $2_3$, and a commutation capacitor circuit $6_1$, $6_2$, $6_3$. The inputs of the commutation capacitor circuits $6_1$, $6_2$, $6_3$ are connected with a choke circuit 8, the input of which is connected via a switching unit 10 with the power line supply 12. Each commutation capacitor circuit $6_1$, $6_2$, $6_3$ has three capacitors C1, C2 and C3 which are here connected in a Delta configuration. However, the commutation capacitors C1, C2 and C3 can also be connected in a Star configuration. The choke circuit 8 has three inductances L1, L2 and L3, with each inductance being located in a corresponding power line. The switching unit 10 has three switches S1, S2 and S3 which can be used to disconnect the power lines between the power supply 12 and the choke circuit 8. An input of a voltage supply unit 14 is connected with the outputs of the switching unit 10, whereas the output of the voltage supply unit 14 is connected with a supply voltage terminal of the controller 4'. The controller 4' is supplied with at least two measured line voltages $u_{N3}$, $u_{N2}$, two measured capacitor voltages $u_{C3}$, $u_{C2}$, and two measured line currents $i_{N3}$, $i_{N2}$. The output of controller 4' is connected to the control inputs of the switching unit 10 and to controllers $4''_1$, $4''_2$ and $4''_3$ located proximate to the converter. Each of these controllers $4''_1$, $4''_2$ and $4''_3$ is supplied with a measured actual rotation speed value $n_{mess}$. The controller 4' generates signals $n^*_1$, $n^*_2$, $n^*_3$, and $K_\mu$ and supplies these signals to the controllers $4''_1$, $4''_2$ and $4''_3$.

Figure 5B:
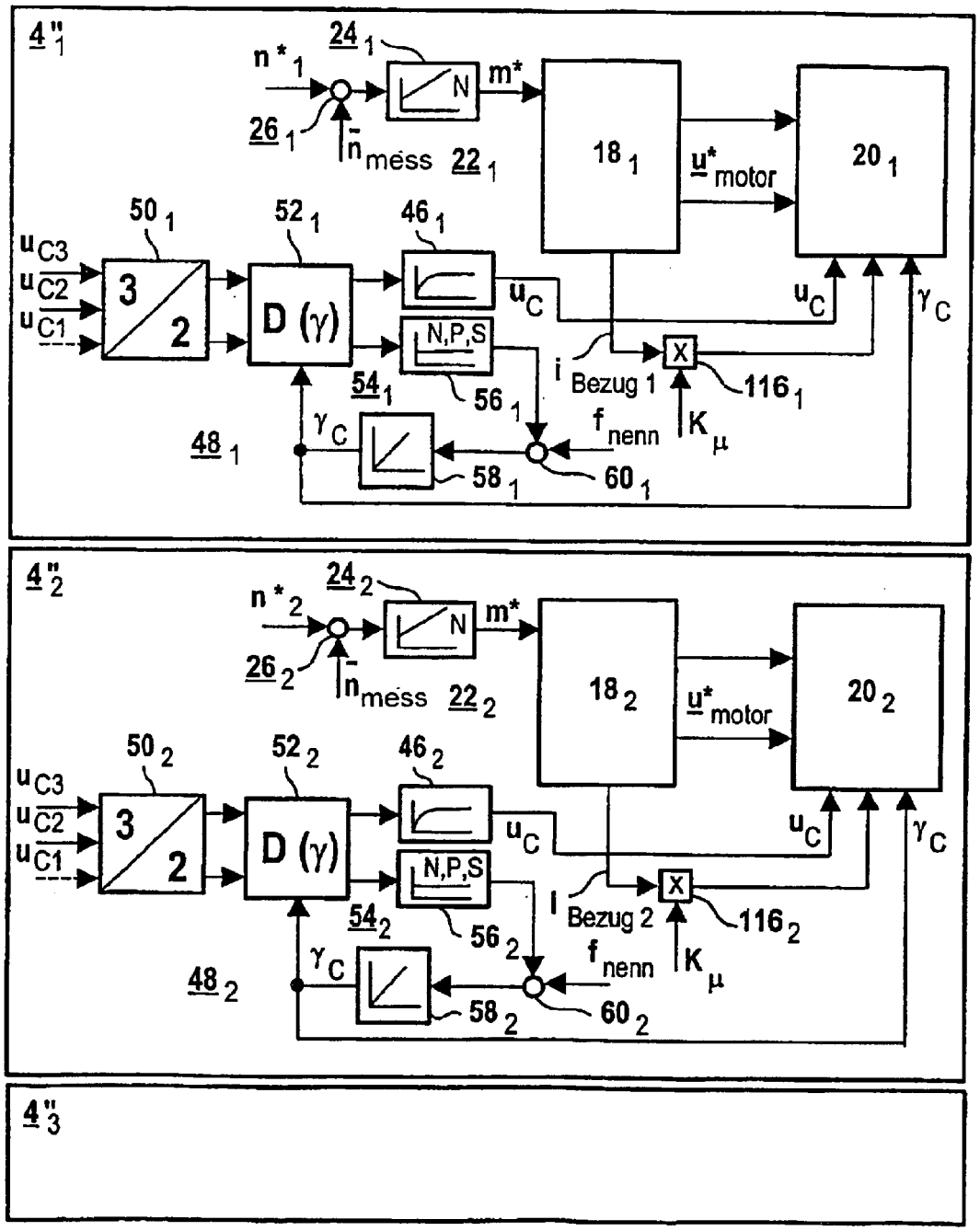
FIG. 5 is a functional block diagram of a controller for the multi-axis drive of FIG. 4.

FIG. 5, split into FIGS. 5A and 5B for sake of clarity, shows a detailed functional block diagram of the multi-axis drive according to FIG. 4. Unlike the functional block diagram of FIG. 2, in the functional block diagram of FIG. 4 the controller 4 is subdivided into a central unit 4' and several converter units 4"$_1$, 4"$_2$ and 4"$_3$. The central unit 4' includes the units 28, 32 and 48 for measuring an actual power line current space vector $\vec{i}_{netzmess}$, an actual power line voltage space vector $\vec{u}_{netzmess}$, and an actual capacitor voltage space vector $\vec{u}_{Cmess}$. The central unit 4' also includes the reactive current control circuit 30, the vector phase control circuits 54 and 72, the line voltage monitoring unit 62, the sequence controller 70, the phase angle control circuit 92, as well as a modified voltage control circuit 88. These components have already been described in detail and will therefore not be described again. The control variable for the power factor is here indicated by $K_\mu$. Also, this control variable is here not applied directly to an input of a control unit 20$_1$, 20$_2$ and 20$_3$; instead, each drive weights this control variable $K_\mu$ with a separate reference value $i_{Bezug}$ which is generated by a control unit 18$_1$, 18$_2$ and 18$_3$ of the converter units 4"$_1$, 4"$_2$ and 4"$_3$. The separate reference value $i_{Bezug}$ can be derived, for example, from the line current, from the idle current of the motor, from a minimal current at field weakening or from the instantaneous reactive current capability of the associated drive. Alternatively, the various reference values $i_{Bezug}$ can also be adjusted depending on how the total reactive current is divided among the drives. Because the control variable $K_\mu$ is processed separately, the input-side reactive currents of all drives of the multi-axis drive can be controlled by the same signal $K_\mu$.

A unit 108 for coordinating the axes is connected downstream of the voltage control circuit 88, whereby a unit 110 for evaluating a nominal main speed setpoint n* is connected between the voltage control circuit 88 and the unit 108. The nominal main speed value n* is used to control the speed of the entire multi-axis drive. The evaluation unit 110 includes a multiplier 112 and a subtracter 114. The nominal main speed value n* is applied to a first input of the multiplier 112, and a weighting factor $K_U$ received from the output of the subtracter 114 is applied to the second input of the multiplier 112. The output of the multiplier 112 is connected with an input of the coordination unit 108. A constant having a value of one is applied to a first input of the subtracter 114, while the second input of the subtracter 114 is connected with the output of the voltage control circuit 88. Since the voltage control circuit 88 is active only during the buffer and synchronization mode, the main speed setpoint n* is in normal operating mode transmitted unchanged to the coordination unit 108. The nominal main speed value n*** is decreased in buffer operating mode and during the synchronization, so that the total power supplied to all drives is zero, i.e., the entire power requirement is covered by the kinetic energy of the multi-axis drive.

The coordination unit 108 can be implemented as a synchronization controller, an electronic gear, electronic cam disks or similar linkages, as are customary in multi-axis drive configurations. In a more complex implementation of the coordination unit 108, the multi-axis drive can also be controlled by maintaining the speed of individual drives or groups of drives unchanged when operating in buffer operating mode and during the synchronization, with only certain drives of this multi-axis drive assuming the function "kinetic buffering". Like with a single drive, a ramp generator can return the drive slowly to its original main speed after the return of the power line voltage. The other aforementioned units of this central unit 4' operate essentially as with a single drive according to FIG. 2. The central unit 4' can be implemented as a separate signal processing unit. Alternatively, the central unit 4' can also be associated with a particular drive, for example a master drive, of a multi-axis drive. The central unit 4' can also be distributed across the signal processing units for the individual drives.

Since the control unit 20 of the matrix converter 2 requires the smoothed components of the measured actual capacitor voltage space vector $\vec{u}_{Cmess}$ (actual input voltage space vector), the measured capacitor voltages $u_{C1}$, $u_{C2}$ and $u_{C3}$ are supplied to each drive of the multi-axis drive depicted in FIG. 4. As shown in the functional block diagram of FIG. 5, each converter unit 4"$_1$, 4"$_2$ and 4"$_3$ includes a unit 48$_1$, 48$_2$ and 48$_3$ for measuring an actual capacitor voltage space vector $\vec{u}_{Cmess}$. Since the components of this measured actual capacitor voltage space vector $\vec{u}_{Cmess}$ have to be smoothed, corresponding smoothing filters 46$_1$, 46$_2$ and 46$_3$, and vector phase control circuits 54$_1$, 54$_2$ and 54$_3$ are each connected downstream to corresponding units 48$_1$, 48$_2$ and 48$_3$. The outputs of the smoothing filters 46$_1$, 46$_2$ and 46$_3$, and of the vector phase control circuits 54$_1$, 54$_2$ and 54$_3$ are each connected with corresponding inputs of the control unit 20$_1$, 20$_2$ and 20$_3$. Each of the converter units 4"$_1$, 4"$_2$ and 4"$_3$ also includes a multiplier 116$_1$, 116$_2$ and 116$_3$ for a separate weighting of the control signal $K_\mu$ for the power factor. The generated control signal $K_\mu$ is supplied to one input of the multiplier 116$_1$, 116$_2$ and 116$_3$, whereas a reference current value $i_{Bezug1}$, $i_{Bezug2}$ and $i_{Bezug3}$ is applied to the other input. The outputs of the multipliers 116$_1$, 116$_2$ and 116$_3$ are connected to corresponding inputs for the control variable of the power factor of the control units 20$_1$, 20$_2$ and 20$_3$.

Figure 6:
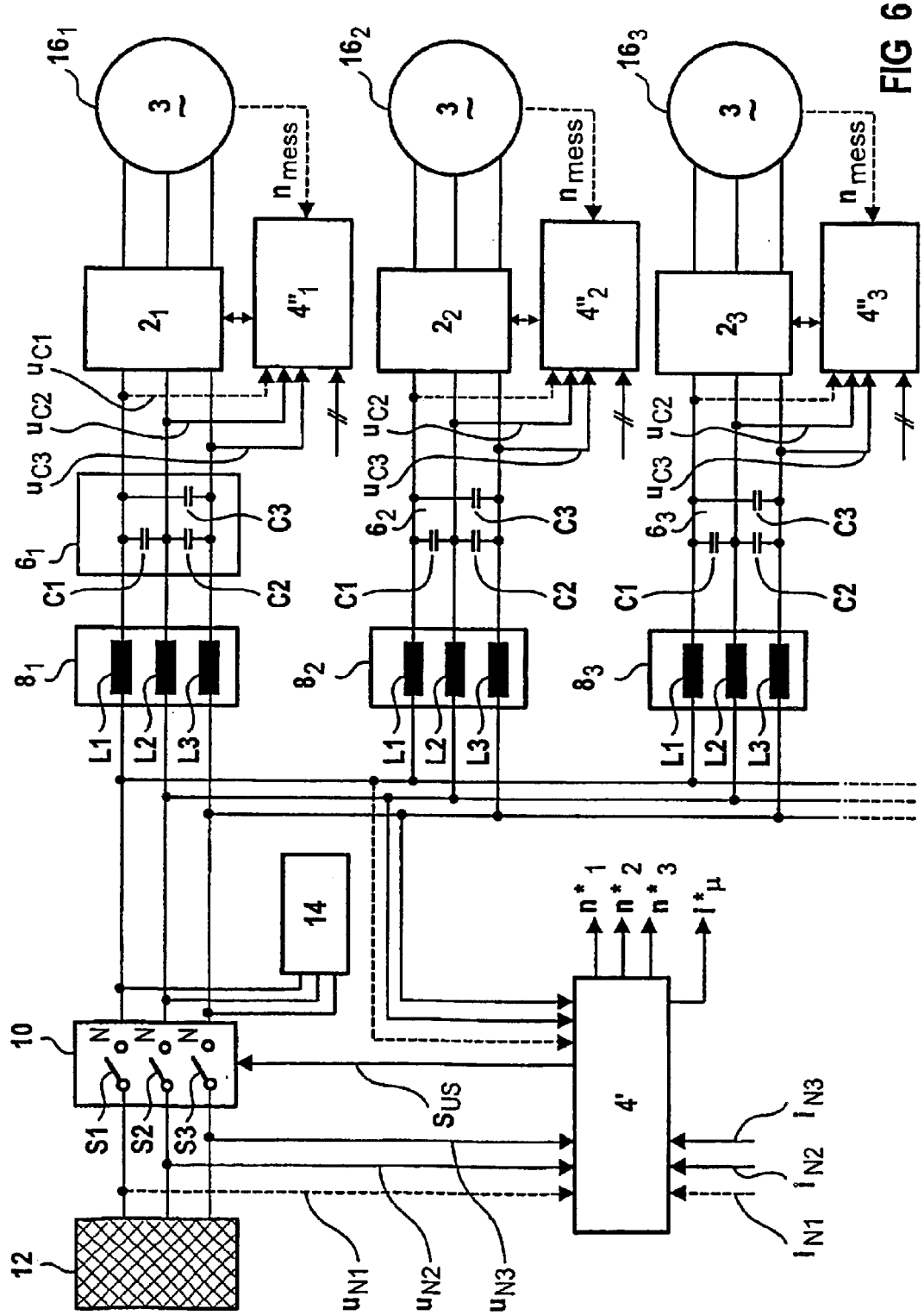
FIG. 6 shows a block circuit diagram of a variant of a multi-axis drive.

FIG. 6 depicts a variant of the multi-axis drive of FIG. 4. Unlike the multi-axis drive of FIG. 4, this variant of the multi-axis drive has a choke unit 8$_1$, 8$_2$ and 8$_3$ associated with each drive. As a result, each drive of the multi-axis drive has its own line filter which is formed by the respective inductances L1, L2 and L3 of the choke unit 8$_1$, 8$_2$ and 8$_3$ and the capacitors C1, C2 and C3 of the commutation capacitor circuit 6$_1$, 6$_2$ and 6$_3$. The voltages before and after the switching unit 10 are then evaluated by the central unit 4'. The multi-axis drive hence includes several individual drives according to FIG. 1 which are electrically connected in parallel on the input side.

Figure 7A:
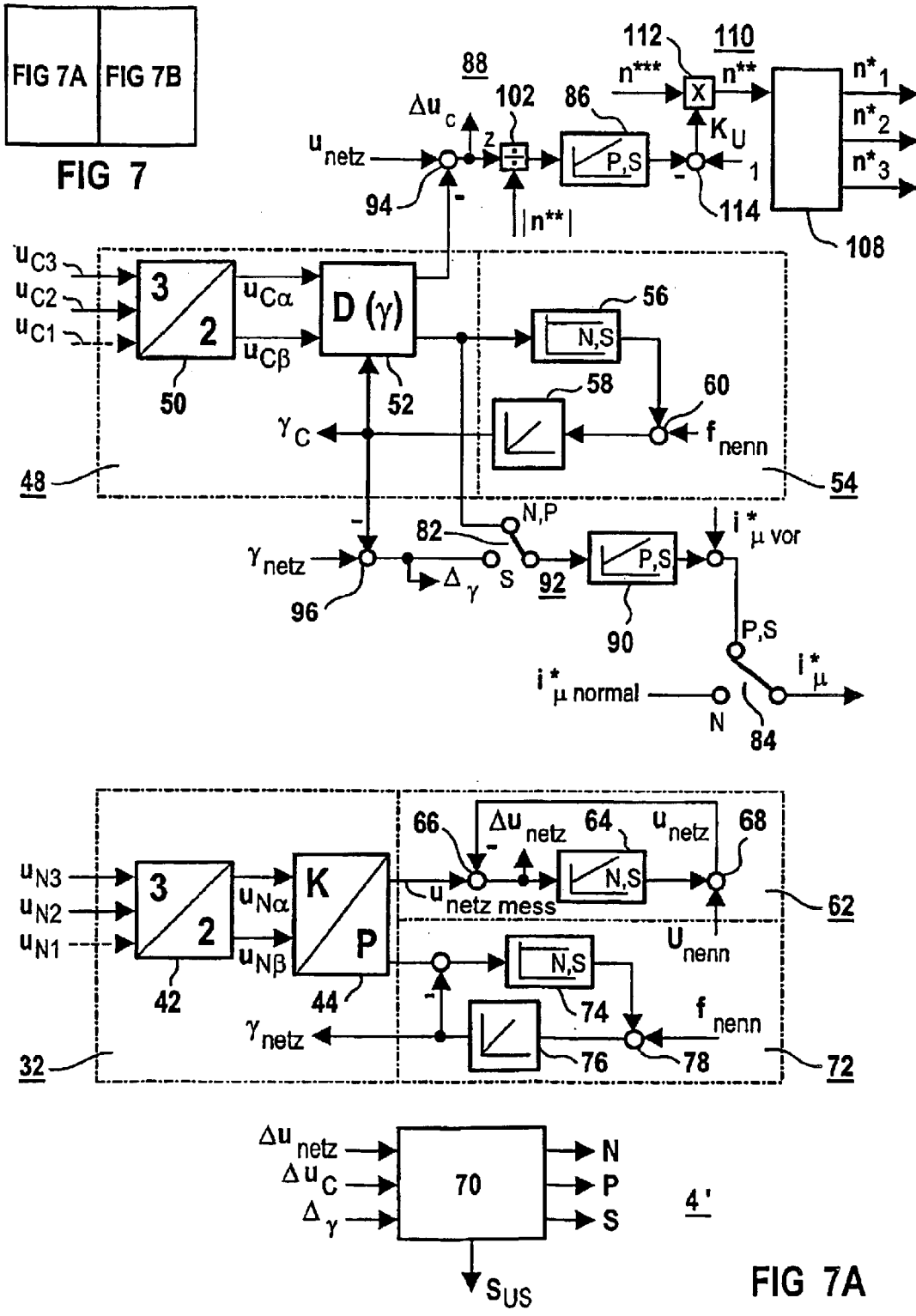
FIG. 7 shows a functional block diagram of the controller for the multi-axis drive of FIG. 6.
Figure 7B:
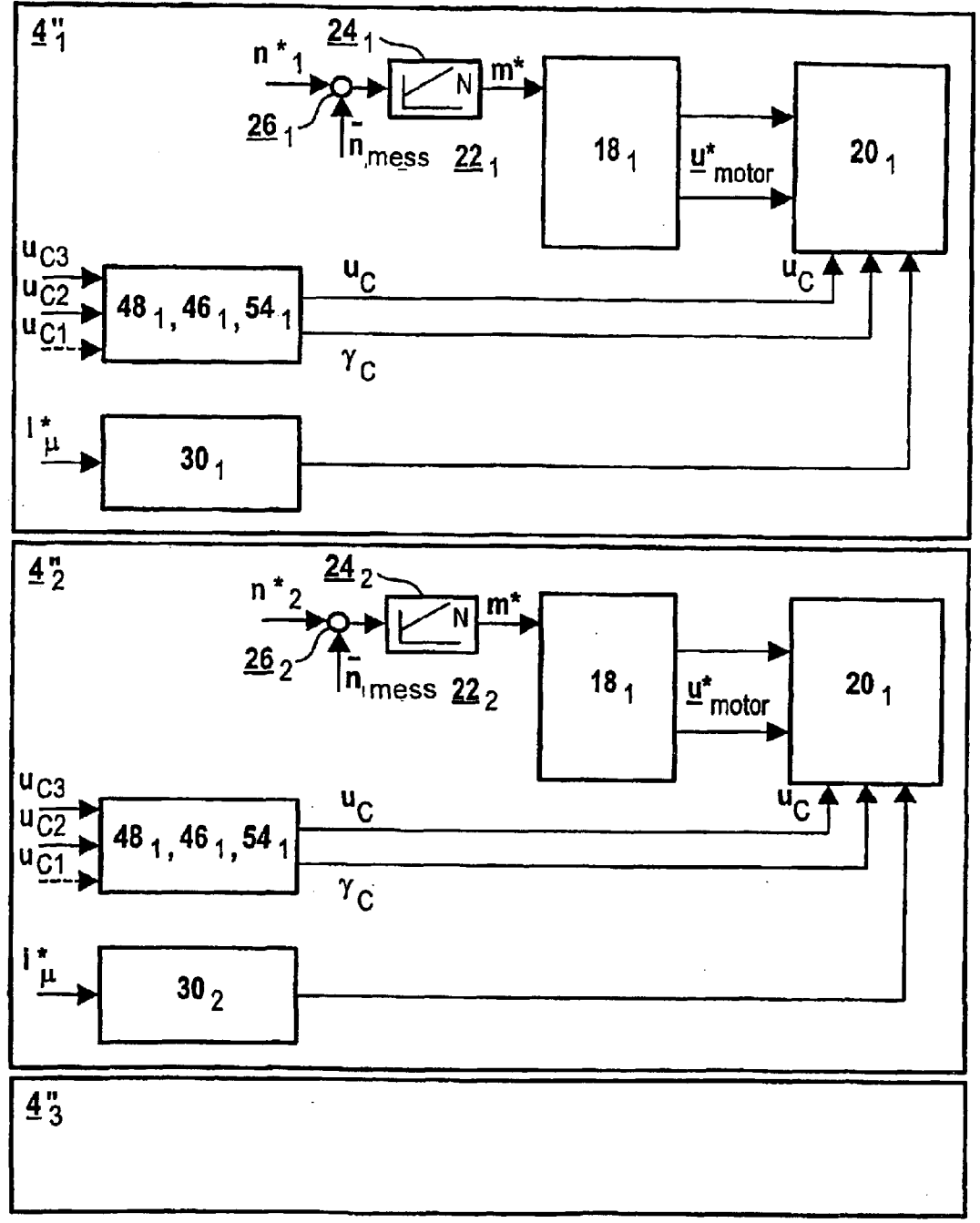

FIG. 7 shows a detailed functional block diagram for the multi-axis drive of FIG. 6. Unlike the functional block diagram of FIG. 5, this functional block diagram provides a pre-control value i*$_{\mu normal}$ instead of employing a unit 28 for measuring an actual power line current space vector $\vec{i}_{netzmess}$ in conjunction with a downstream reactive current control circuit 30. Each converter unit 4"$_1$, 4"$_2$ and 4"$_3$ includes here a reactive current control circuit 30$_1$, 30$_2$ and 30$_3$. The output of each reactive current control circuit 30$_1$, 30$_2$ and 30$_3$ of the converter units 4"$_1$, 4"$_2$ and 4"$_3$ is connected with a corresponding input for the control variable of the power factor of a corresponding control unit 20$_1$, 20$_2$ and 20$_3$. In normal operating mode, each drive of the multi-axis drive then regulates a separate reactive current. These control variable inputs are used in buffer operating mode and during synchronization for regulating the angle of the bus bar voltage.

Not all individual drives in a multi-axis drive have to be of the type matrix converter. The combination with other converters, for example conventional intermediated circuit converters, is possible. For example, a converter equipped with an active front end (AFE) can advantageously supply at least a portion of the reactive capacitor power, or even the entire reactive power. An input side of a converter with an active front end, unlike a matrix converter, can supply the maximum current of the converter as a reactive current—if the drive is lightly loaded. This variant operates also if the voltage intermediate circuit converter lacks an inverter, i.e., if the active front end converter supplies power only to a capacitor. In this case, the AFE converter supplies exclusively a reactive power.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for bridging brief power outages in a matrix converter with a plurality of power input side commutation capacitors and a power input side switching unit, the method comprising the steps of:

in the event of a detected power outage, immediately disconnecting the matrix converter from the power supply, so that the matrix converter operates in a buffer operating mode;

controlling the matrix converter in the buffer operating mode so as to generate at an input of the matrix converter an actual capacitor voltage space vector with a predetermined amplitude and phase angle;

when the line power is reestablished, tracking the created actual capacitor voltage space vector during a synchronization phase with respect to a measured actual power line voltage space vector until the actual capacitor voltage space vector and the actual power line voltage space vector coincide; and reconnecting the matrix converter to the power supply.

2. The method of claim 1, and further comprising the step of presetting a reactive current control variable for a normal operating mode, a buffer operating mode, and a synchronization operating mode of the matrix converter.

3. The method of claim 1, wherein brief power outages are bridged in several matrix converters, with each matrix converter being operatively connected to a corresponding drive having a current reference value, and further comprising the step of generating a reactive current control variable for each drive that is weighted with the corresponding current reference value.

4. The method of claim 1, and further comprising the steps of forming from capacitor voltages, which are measured across the plurality of power input side commutation capacitors, two orthogonal voltage components of an actual capacitor voltage space vector, and smoothing the phase angle of the actual capacitor voltage space vector based on a nominal value of a power line frequency to determine from the two orthogonal voltage components the amplitude and phase angle of the actual capacitor voltage space vector.

5. The method of claim 1, and further comprising the steps of forming from measured phase voltages two orthogonal voltage components of an actual power line voltage space vector, transforming the orthogonal voltage components into polar components having an amplitude and phase angle, comparing the amplitude of the actual power line voltage space vector with a nominal amplitude value and evaluating a detected amplitude deviation for switching from a normal operating mode to a buffer operating mode and from the buffer operating mode to a synchronizing operating mode, and smoothing the phase angle of the actual power line voltage space vector with a nominal value of the power line frequency.

6. The method of claim 1, wherein the matrix converter is reconnected to the power supply depending on a detected amplitude deviation between the amplitude of the actual capacitor voltage space vector and the amplitude of the actual power line voltage space vector, and depending on a detected phase angle deviation between the phase angle of the actual capacitor voltage space vector and the phase angle of the actual power line voltage space vector, and further comprising the step of changing from the synchronizing operating mode to a normal operating mode.

7. The method of claim 5, and further comprising the steps of defining pre-control values for amplitude and phase components of a nominal capacitor voltage space vector, and controlling the actual capacitor voltage space vector to the nominal capacitor voltage space vector.

8. The method of claim 7, wherein the pre-control value for controlling the amplitude component of the actual capacitor voltage space vector corresponds to an expected dissipated power of the matrix converter.

9. The method of claim 7, wherein the pre-control value for controlling the phase angle component of the actual capacitor voltage space vector corresponds to an expected reactive current of an actual power line current space vector.

10. The method of claim 1, and further comprising the steps of comparing an amplitude of the actual power line voltage space vector with an upper and a lower tolerance limit value, and switching from a synchronizing operating mode to a buffer operating mode and from a normal operating mode to a normal operating mode when the amplitude of the actual power line voltage space vector is greater than the upper tolerance limit value or smaller than the lower tolerance limit value.

11. A device for bridging brief power outages in a matrix converter, wherein the matrix converter includes a controller, a plurality of power input side commutation capacitors and a power input side switching unit, said device comprising:

a first unit for measuring an actual capacitor voltage space vector;

a second unit for measuring an actual power line voltage space vector, said second unit connected with two control inputs of the controller of the matrix converter;

a plurality of switches;

a voltage control circuit having an input which is connected with an amplitude output of the first unit and another input which is connected with an amplitude output of the second unit, and an output which is connected via a first of the plurality of switches with a setpoint input of the controller of the matrix converter;

a phase angle control circuit having an input connected with corresponding phase angle outputs of the first and second unit, and an output connected via a second switch with a third control input of the controller of the matrix converter;

a power line voltage monitoring device having an input which is connected with an amplitude output of the second unit; and a sequence controller having an input which is connected with a deviation output of the voltage control circuit, of the phase control circuit and of the power line voltage monitoring device, and an output which is connected with a control input of the plurality of switches and with a control input of the switching unit.

12. The device of claim 11, and further comprising a vector phase control circuit connected with the outputs of the phase outputs of the first and second units.

13. The device of claim 12, wherein the output of the second switch is connected with a frequency input of the vector phase control circuit, with the phase angle input of the vector phase control circuit being connected with the phase angle output of the first unit.

14. The device of claim 11, wherein the first unit comprises a coordinate transformer with a vector rotator connected downstream of the coordinate transformer.

15. The device of claim 11, wherein the second unit comprises two coordinate converters connected in series.

16. The device of claim 11, and further comprising a smoothing device connected downstream of the amplitude output of the first unit.

17. The device of claim 11, and further comprising a vector phase control circuit connected downstream of the phase angle output of the second unit.

18. The device of claim 11, wherein the voltage control circuit further comprises a comparator with a regulator connected downstream of the comparator.

19. The device of claim 11, wherein the phase angle control circuit further comprises a comparator with a regulator connected downstream of the comparator.

20. The device of claim 11, and further comprising a comparator connected to an input of the phase angle control circuit and a regulator connected downstream of the phase angle control circuit, with a first input of the regulator connected to an output of the comparator through a third of the plurality of switches and a second input of the regulator connected to the phase angle error output of the second unit.

21. The device of claim 11 in the form of a signal processor.

22. A device for bridging brief power outages in a matrix converter, wherein the matrix converter includes a controller, a plurality of power input side commutation capacitors and a power input side switching unit, the device comprising:

a first unit for measuring an actual capacitor voltage space vector;

a second unit for measuring an actual power line voltage space vector, said second unit connected with two control inputs of the controller of the matrix converter;

a plurality of switches;

a voltage control circuit having an input which is connected with an amplitude output of the first unit and another input which is connected with an amplitude output of the second unit, and an output which is connected via a first of the plurality of switches with a setpoint input of the controller of the matrix converter;

a phase angle comparator having an input connected with corresponding phase angle outputs of the first and second units, and an output connected with a control input of the controller of the matrix converter;

a power line voltage monitoring device connected with an amplitude output of the second unit;

a sequence controller having an input which is connected with a deviation output of the voltage control circuit, of the power line voltage monitoring device and of the phase angle comparator, and an output which is connected with a control input of the plurality of switches and with a control input of the switching unit, wherein a control variable is applied to inputs of a second and third of the plurality of switches, and wherein an output of the third switch, the amplitude output and phase angle output of the first unit are each connected with additional control inputs of the controller of the matrix converter.

23. The device of claim 22, and further comprising a vector phase control circuit connected with the outputs of the phase outputs of the first and second units.

24. The device of claim 23, wherein the output of the second switch is connected with a frequency input of the vector phase control circuit, with the phase angle input of the vector phase control circuit being connected with the phase angle output of the first unit.

25. The device of claim 22, wherein the first unit comprises a coordinate transformer with a vector rotator connected downstream of the coordinate transformer.

26. The device of claim 22, wherein the second unit comprises two coordinate converters connected in series.

27. The device of claim 22, and further comprising a smoothing device connected downstream of the amplitude output of the first unit.

28. The device of claim 22, and further comprising a vector phase control circuit connected downstream of the phase angle output of the second unit.

29. The device of claim 22, wherein the voltage control circuit further comprises a comparator with a regulator connected downstream of the comparator.

30. The device of claim 22, in the form of a signal processor.

31. A controller for a matrix converter capable of bridging brief power outages, comprising:

a plurality of power input side commutation capacitors, a power input side switching unit connected between the power supply and the commutation capacitors, a first unit for measuring an actual capacitor voltage space vector;

a second unit for measuring an actual power line voltage space vector, said second unit connected with two control inputs of the controller of the matrix converter;

a plurality of switches;

a voltage control circuit having an input which is connected with an amplitude output of the first unit and another input which is connected with an amplitude output of the second unit, and an output which is connected via a first of the plurality of switches with a setpoint input of the controller of the matrix converter;

a phase angle control circuit having an input connected with corresponding phase angle outputs of the first and second unit, and an output connected via a second switch with a third control input of the controller of the matrix converter;

a power line voltage monitoring device having an input which is connected with an amplitude output of the second unit; and a sequence controller having an input which is connected with a deviation output of the voltage control circuit, of the phase control circuit and of the power line voltage monitoring device, and an output which is connected with a control input of the plurality of switches and with a control input of the switching unit.

32. A controller for a matrix converter capable of bridging brief power outages, comprising:

a plurality of power input side commutation capacitors, a power input side switching unit connected between the power supply and the commutation capacitors, a first unit for measuring an actual capacitor voltage space vector;

a second unit for measuring an actual power line voltage space vector, said second unit connected with two control inputs of the controller of the matrix converter;

a plurality of switches;

a voltage control circuit having an input which is connected with an amplitude output of the first unit and another input which is connected with an amplitude output of the second unit, and an output which is connected via a first of the plurality of switches with a setpoint input of the controller of the matrix converter;

a phase angle comparator having an input connected with corresponding phase angle outputs of the first and second units, and an output connected with a control input of the controller of the matrix converter;

a power line voltage monitoring device connected with an amplitude output of the second unit;

a sequence controller having an input which is connected with a deviation output of the voltage control circuit, of the power line voltage monitoring device and of the phase angle comparator, and an output which is connected with a control input of the plurality of switches and with a control input of the switching unit, wherein a control variable is applied to inputs of a second and third of the plurality of switches, and wherein an output of the third switch, the amplitude output and phase angle output of the first unit are each connected with additional control inputs of the controller of the matrix converter.

* * * * *